Feb. 22, 1955   R. CAPSEK   2,702,685

FUEL METERING DEVICE

Filed June 20, 1951

AIR INTAKE PRESSURE

TO FUEL PUMP

TO FUEL PUMP

FUEL

ROTARY PISTON VALVE
CONTROL FLUID UNDER
PRESSURE

INVENTOR:
ROGER CAPSEK
BY:

United States Patent Office 2,702,685
Patented Feb. 22, 1955

2,702,685

FUEL METERING DEVICE

Roger Capsek, Paris, France, assignor to Bronzavia S. A., Courbevoie, France, a corporation of France Application June 20, 1951, Serial No. 232,500

Claims priority, application France June 23, 1950

6 Claims. (Cl. 251—61)

The present invention relates to a fluid control device which is adapted to modulate the pressure of a fluid (controlled fluid) as a reverse function of variations in the pressure of another fluid (controlling fluid).

The fluid control device according to the invention comprises a piston valve subjected on one of its faces to the action of a stack of capsules disposed in a chamber in which prevails a pressure which is equal or proportional to that of the controlling fluid, the interior of said piston valve being adapted to be connected, through suitable apertures, on the one hand with a pipe, which is connected with the pipe line for the controlled fluid and into which opens, through a calibrated orifice a second pipe connected with the source of controlled fluid under pressure, and on the other hand with a discharge aperture for the controlled fluid, these apertures being disposed in such manner that an increase of pressure of the controlled fluid, exercizing on the valve a thrust greater than that exercized by the capsules, slightly moves the piston valve to a position where its inner space is set in communication with the discharge aperture, the valve thus remaining constantly in equilibrium under the action of the controlling fluid pressure and the controlled fluid pressure which controls the spring-like action of the capsules opposing said controlled fluid pressure.

The invention will be more readily understood from the following description, with reference to the accompanying drawing, which is given solely by way of example, and in which.

Figure 1:
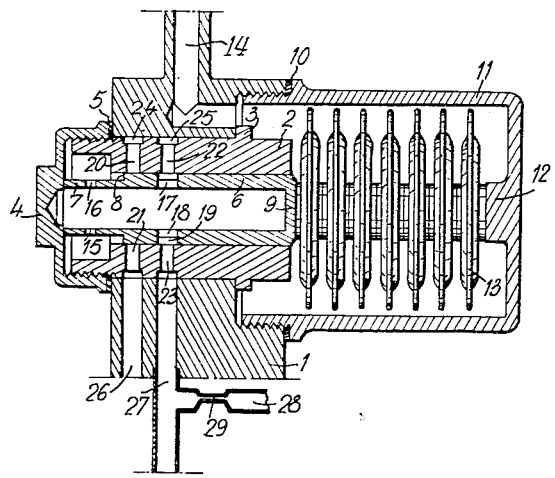
Fig. 1 is a longitudinal sectional view of a control device according to the invention.

The fluid control device shown in Fig. 1 comprises a bracket 1 in which is housed a cylindrical sleeve 2, held in place by a collar 3 and a hollow screw-threaded cap 4, screwed on said cylindrical sleeve 2 with the interposition of a sealing washer 5.

In the chamber formed by the cap 4 and the cylindrical sleeve 2 is slidably mounted a cylindrical piston valve 6, one end portion 7 of which is open and, in the idle position, abuts against cap 4. End portion 7 of piston 2 has a reduced diameter, thus forming a shoulder 8. The opposite end 9 of said piston is closed.

On bracket 1 is screwed, with the interposition of a sealing washer 10 a cylindrical casing 11 having an inner boss 12, against which bears a stack of capsules 13, which at the opposite end bears against the closed end of valve 6.

A conduit 14 formed in bracket 1, connects the interior of casing 11 with a source of controlling fluid having a variable pressure, which will act on the capsules 13.

Valve 6 is provided with four apertures 15, 16, 17, 18, diametrically opposed to each other in pairs 15, 16 and 17, 18. Apertures 15, 16 place the interior of valve 6 in communication with the inside of cap 4 and apertures 17, 18 are connected together by a circular groove 19.

Cylindrical sleeve 2 is provided with four apertures 20, 21, 22, 23 diametrically opposed to each other in pairs, the apertures 20, 21, 22, 23 of one pair being connected together by means of circular grooves 24, 25, respectively. In the idle position illustrated, the apertures 17, 18 in valve 6 register with the apertures 22, 23 in sleeve 2. Valve 6, when in the idle position, covers the apertures 20, 21 in sleeve 2.

Apertures 21, 23 at the lower part of sleeve 2 cooperate with respective conduits 26, 27 provided in the bracket. Conduit 27 is supplied with oil under a constant pressure through a pipe 28 and a calibrated orifice 29, and conduit 26 serves for the oil discharge. The part of the conduit 27 extending vertically below the pipe 28 may form part of a pipe line to any pressure sensitive means to be controlled.

The operation is as follows:

At rest, the apparatus contains no oil and the open end 7 of valve 6 abuts against cap 4 under the action of the resilient stack of capsules 13. The apertures 20, 21 in sleeve 2 are covered by valve 6.

Oil is then supplied under a pressure, which is greater than the operating pressure of the piston valve, through pipe line 28, calibrated orifice 29, conduit 27, apertures 22, 23 in sleeve 2 and apertures 17, 18 in the valve 6. The oil fills valve 6 and, through apertures 15, 16 in the valve, the interior of cap 4. The increasing pressure developed within valve 6 collapses the stack of capsules 13 and valve 6 is shifted towards the right, whereby the reduced end thereof uncovers apertures 20, 21 in sleeve 2, thus establishing communication between the inner space of valve 6 and discharge conduit 26. The pressure of the oil upon valve 6 balances the force exerted by the capsules 13, which are subject to the pressure of the controlling fluid. When said pressure increases, the stack of capsules is further collapsed and the force exerted thereby on valve 6 decreases. Valve 6 moves towards the right and uncovers the apertures 20, 21 in cylindrical sleeve 2 to a greater extent. The oil pressure drops and a new state of equilibrium is reached. The effect is the reverse when the variable pressure of the controlling fluid decreases. Valve 6, and hence pipe 27 (in communication with said valve through the apertures 17, 18 in the valve, the apertures 22, 23 and the groove 25 in piston sleeve 2) are therefore the seat of a variable pressure which is modulated by the variable pressure of the controlling fluid acting on the capsules so that the modulated pressure increases as the pressure of the controlling fluid decreases, and vice versa.

Figure 2:
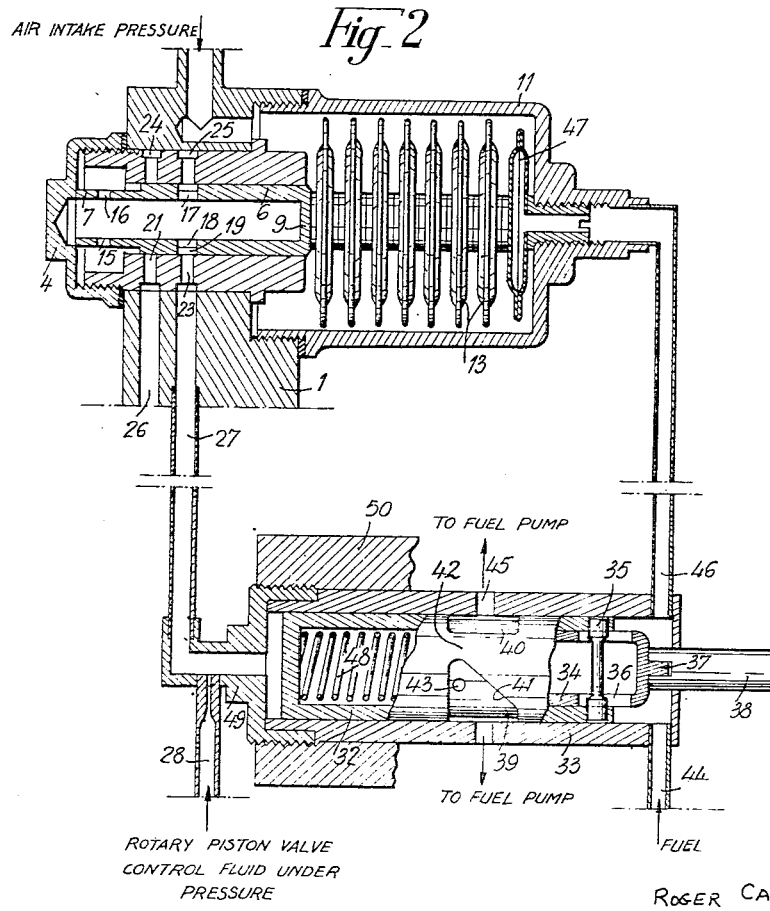
Fig. 2 is a similar view of the fluid control device associated with a regulating device for fuel injection pumps.

Fig. 2 shows a practical embodiment of the fluid control device associated with the fuel flow regulator for fuel injection pumps in an internal combustion engine, such as described in the co-pending patent application Serial No. 232,499 filed by the applicant on the same date and entitled "Injection Pump."

Said regulator comprises a metering valve in the form of a piston valve 32 rotatably and slidably mounted in a cylindrical casing 33. A sleeve 34 connected with piston valve 32 by means of a pin 35 secured in said piston valve 32 and adapted to slide in slots 36 of the sleeve, thus allowing an axial movement of piston valve 32, rotation thereof being controlled by means of a coupling 37 on the sleeve 34, engaging a rotary shaft 38.

Said piston valve is formed toward its middle portion with a recess 39 limited by a generatrix portion 40 and an inclined portion 41, whereby the remaining solid portion 42 has a circumferential length which increases progressively from the left towards the right in successive transverse planes. This recess 39 is provided with apertures 43 connecting the interior of piston valve 32, into which liquid fuel is supplied through a pipe 44, with apertures 45 in the cylindrical casing 33, each of said apertures being connected with an engine cylinder fuel injection pump (not shown). The pressure of the fuel prevailing within the piston valve is transmitted by a pipe line 46, to the inside of a capsule 47, provided in addition to the stack of capsules 13.

A spring 48 is interposed between sleeve 34 and piston valve 32 and a pipe 27 connects the fluid control device as described in Fig. 1 with the end face of piston valve 32, by means of a hollow nipple 49 screwed in the regulator casing 50. Pipe 28 connects the pipe 27 to a source of oil under pressure.

The operation of the fluid control device takes place as described with reference to Fig. 1; in the embodiment of Fig. 2, the variable pressure of the controlling fluid is the admission pressure of the air of combustion acting through inlet 14 and this pressure controls, by means of the fluid control device the axial position of the piston valve 32 and thereby the period during which the apertures 45 are obturated by the solid portion 42.

When the admission pressure drops, the modulated oil pressure increases and, acting on piston valve 32, causes the latter to move in its casing 33 towards the right, the width of the solid portion 42 opposite the apertures 45 in casing 33 decreases, and the apertures are covered during a smaller fraction of revolution of the piston valve. As said apertures are covered, communication between the engine fuel injection pumps and the fuel feed circuit is interrupted. The time during which apertures 45 are covered thus determines the duration of the injection, and consequently the fuel output supplied per piston stroke to the engine cylinders. Hence, when the admission pressure drops, the duration of the period of injection and the fuel output decrease in proportion, and vice versa.

Piston valve 32 is constantly in a state of equilibrium under the opposed effects of the modulated oil pressure on the one hand and the tension of spring 48 and the fuel pressure within piston valve 32 on the other hand.

In order that said equilibrium should not be modified by variations in the fuel pressure, this pressure is transmitted through pipe 46 in capsule 47, the action of which is thus added to that of the stack of capsules 13. Due to this arrangement, if the fuel pressure drops, piston valve 32 tends to move towards the right, but the fuel pressure also drops in capsule 47; the latter collapses and, as above explained, the oil pressure within valve 6 tends to drop.

It will be easily understood that capsule 47 may be so devised that, when the fuel pressure drops by a certain amount, the oil pressure in valve 6, and hence on the left hand end of piston valve 32, drops by the same amount, whereby the position of piston valve 32 will remain unchanged, as the balance of forces is not altered.

It will be understood that the invention is not limited to the embodiments above described which have been given merely by way of example.

Having now described my invention what I claim as new and desire to secure by Letters Patent is:

1. In a fluid pressure control device wherein a first fluid pressure is relieved as a conjoint function of the pressure of said fluid and the pressure of a second fluid and wherein a stack of pressure sensitive capsules is subject to said second fluid pressure, a valve structure comprising a support, a chamber provided in this support one end of this chamber being closed, a hollow piston valve slidably mounted in said chamber, one end of this hollow piston valve remote from the closed end of said chamber being closed, the stack of pressure sensitive capsules being axially held between the closed end of the hollow piston valve and said support, at least one radial inlet port provided in the hollow piston valve and communicating with the interior of the latter, at least one inlet aperture and at least one exhaust aperture provided in said support and communicating with said chamber for said first fluid, said inlet and exhaust apertures being so arranged with respect to the hollow piston valve that said inlet aperture is in continuous communication with the interior of the hollow piston valve through said radial inlet port for any axial position of the hollow piston valve and said exhaust aperture is obturated by the hollow piston valve when the latter is in the position it occupies when the stack of capsules is substantially fully extended, the exhaust aperture being opened by the hollow piston valve when the latter is in any other position and communicating with the interior of the hollow piston valve, whereby said hollow piston valve maintains such position in said chamber that the force exerted thereon by said first fluid pressure balances the force exerted thereon in the opposite direction by the stack of capsules which are subject to the pressure of said second fluid.

2. A fluid pressure control device wherein a first fluid pressure is relieved as a conjoint function of the pressure of said fluid and the pressure of a second fluid, comprising a support, a casing connected to the latter, an aperture in this casing for the communication of the inside thereof with said second fluid, a chamber provided in said support one end of said chamber being closed while the other end thereof is open and communicates with the interior of said casing, a piston valve axially slidably mounted in said chamber, a stack of pressure sensitive capsules disposed in the casing and axially held between the latter and the end of the piston valve remote from said closed end of the chamber, it being arranged that a space exists on the side of the piston valve adjacent the closed end of the chamber between the latter and the piston valve for all positions of the piston valve so that any fluid contained in this space exerts its pressure in an axial direction on the piston valve, at least one inlet aperture and at least one exhaust aperture provided in the support and communicating with said chamber for said first fluid, these inlet and exhaust apertures being so arranged with respect to the piston valve that the inlet aperture is continuously in communication with said space and said exhaust aperture is obturated by the piston valve when the latter is in the position it occupies when said stack of capsules is substantially fully extended and is opened by the piston valve when the latter is in any other position and communicates with said space, whereby said piston valve maintains such position in said chamber that the force exerted thereon by said first fluid pressure balances the force exerted thereon in the opposite direction by the stack of capsules which are subject to the pressure of said second fluid.

3. A fluid pressure control device wherein a first fluid pressure is relieved as a conjoint function of the pressure of said fluid and the pressure of a second fluid, comprising a support, a casing connected to the latter, an aperture in this casing for the communication of the inside thereof with said second fluid, a chamber provided in said support one end of this chamber being closed while the other end is open and communicates with the interior of said casing, a hollow piston valve axially slidably mounted in said chamber, one end of this hollow piston valve remote from said closed end of said chamber being closed, at least one radial inlet port provided in the hollow piston valve and communicating with the interior thereof, a stack of pressure sensitive capsules disposed in the casing and axially held between the latter and the closed end of the piston valve, at least one inlet aperture and at least one exhaust aperture provided in the support and communicating with said chamber for said first fluid, these inlet and exhaust apertures being so arranged with respect to the piston valve that the inlet aperture is in continuous communication with the inside of said hollow piston valve through said radial inlet port for any axial position of the hollow piston valve, and the exhaust aperture is obturated by the hollow piston valve when the latter is in the position it occupies when the stack of capsules is substantially fully extended and opened by the hollow piston valve when the latter is in any other position, whereby said hollow piston valve maintains such position in said chamber that the force exerted thereon by said first fluid pressure balances the force exerted thereon in the opposite direction by the stack of capsules, which are subject to the pressure of said second fluid.

4. A fluid pressure control device wherein a first fluid pressure is relieved as a conjoint function of the pressure of said fluid and the pressure of a second fluid, comprising a support, a casing connected to the latter, an aperture in this casing for the communication of the inside thereof with said second fluid, a sleeve mounted in said support, one end of this sleeve being closed while the other end is open and communicates with the interior of said casing, a hollow piston valve mounted in said sleeve and axially slidable therein, one end of this hollow piston valve remote from the closed end of the sleeve being closed, a stack of pressure sensitive capsules disposed in the casing and axially held between the latter and the closed end of the hollow piston valve, a first pair and a second pair of apertures provided in said sleeve, the apertures of each pair of apertures being substantially diametrically opposite and connected by an annular passageway, an inlet passage provided in the support and communicating with said first pair of apertures in the sleeve for their connection to said first fluid, an exhaust passage for said first fluid provided in the support and communicating with said second pair of apertures in the sleeve, two inlet ports provided in the hollow piston valve communicating with the interior of the latter and so arranged as to communicate with said first pair of apertures in the sleeve in any position of the hollow piston valve, said second pair of apertures being so located in the sleeve with respect to the hollow piston valve that they are obturated by the latter in the position it occupies when said stack of capsules is substantially fully extended and are progressively opened by the hollow piston valve and communicate with the interior thereof, when the pressure sensitive capsules are progressively compressed, whereby said hollow piston valve maintains such position in said chamber that the force exerted thereon by said first fluid pressure balances the force exerted thereon in the opposite direction by the stack of capsules which are subject to the pressure of said second fluid.

5. A fluid pressure control device wherein a first fluid pressure is relieved as a conjoint function of the pressure of said first fluid and the pressures of a second and a third fluid, comprising a support, a casing connected to the latter, an aperture in this casing for the communication of the inside thereof with said second fluid, a chamber provided in said support, one end of said chamber being closed while the other end thereof is open and communicates with the interior of said casing, a piston valve axially slidably mounted in said chamber, a stack of pressure sensitive capsules and an individual capsule axially adjacent thereto, disposed in the casing and axially held between the latter and the end of the piston valve remote from said closed end of the chamber, it being arranged that a space exists on the side of the piston valve adjacent the closed end of the chamber between the latter and the piston valve for all positions of the piston valve so that any fluid contained in this space exerts its pressure in an axial direction on the piston valve, a second aperture provided in said casing for the communication of the interior of said individual capsule through an aperture therein with said third fluid, at least one inlet aperture and at lease one exhaust aperture provided in the support and communicating with said chamber for said first fluid, these inlet and exhaust apertures being so arranged with respect to the piston valve that the inlet aperture is continually in communication with said space and said exhaust aperture is obturated by the piston valve when the latter is in the position it occupies when said stack of capsules is substantially fully extended and is opened by the piston valve when the latter is in any other position and communicates with said space, whereby said piston valve maintains such position in said chamber that the force exerted thereon by said first fluid pressure balances the force exerted thereon in the opposite direction by the stack of capsules and the individual capsule which are subject to the pressures of said second and third fluids.

6. A fluid pressure control device wherein a first fluid pressure is relieved as a conjoint function of the pressure of said first fluid and the pressures of a second and a third fluid, comprising a support, a casing connected to the latter, an aperture in this casing for the communication of the inside thereof with said second fluid, a chamber provided in said support one end of this chamber being closed while the other end is open and communicates with the interior of said casing, a hollow piston valve axially slidably mounted in said chamber one end of this hollow piston valve remote from said closed end of said chamber being closed, at least one radial inlet port provided in the hollow piston valve and communicating with the interior thereof, a stack of pressure sensitive capsules and an individual capsule axially adjacent thereto disposed in the casing and axially held between the latter and the closed end of the piston valve, a second aperture provided in said casing for the connection of the interior of said individual capsule through an aperture therein to said third fluid, at least one inlet aperture and at least one exhaust aperture provided in the support and communicating with said chamber for said first fluid, these inlet and exhaust apertures being so arranged with respect to the piston valve that the inlet aperture is in continuous communication with the inside of said hollow piston valve through said radial inlet port for any axial position of the hollow piston valve, and the exhaust aperture is obturated by the hollow piston valve when the latter is in the position it occupies when the stack of capsules is substantially fully extended and opened by the hollow piston valve when the latter is in any other position, whereby said hollow piston valve maintains such position in said chamber that the force exerted thereon by said first fluid pressure balances the force exerted thereon in the opposite direction by the stack of capsules and the individual capsule which are subject to the pressures of said second and third fluids.

References Cited in the file of this patent

UNITED STATES PATENTS

| | | |
|---|---|---|
| 2,374,844 | Stokes | May 1, 1945 |
| 2,448,347 | Beeh | Aug. 31, 1948 |
| 2,446,415 | Greenland | Apr. 5, 1949 |
| 2,468,079 | Kirkham | Apr. 26, 1949 |
| 2,557,333 | Zwack | June 19, 1951 |